US009570249B1

(12) United States Patent
Douglas et al.

(10) Patent No.: US 9,570,249 B1
(45) Date of Patent: Feb. 14, 2017

(54) MODULAR REMOTE CONTROL MOUNT

(71) Applicant: Controller Clipz LLC, Bowling Green, KY (US)

(72) Inventors: Brandon Douglas, Louisville, KY (US); Scott Aguiar, Louisville, KY (US)

(73) Assignee: Controller Clipz LLC, Bowling Green, KY (US)

( * ) Notice: Subject to any disclaimer, the term of this patent is extended or adjusted under 35 U.S.C. 154(b) by 106 days.

(21) Appl. No.: 14/535,927

(22) Filed: Nov. 7, 2014

(51) Int. Cl.
*F16M 13/00* (2006.01)
*H01H 9/02* (2006.01)
*F16M 11/16* (2006.01)
*F16M 11/04* (2006.01)

(52) U.S. Cl.
CPC ............ *H01H 9/025* (2013.01); *F16M 11/041* (2013.01); *F16M 11/16* (2013.01)

(58) Field of Classification Search
CPC .. A63F 13/02; A63F 2300/1043; H01H 9/025; F16M 11/16; F16M 11/041
USPC ....... 273/148 B; 248/558, 274.1, 304, 309.1, 248/316.1, 316.7, 346.01, 346.03, 346.06
See application file for complete search history.

(56) References Cited

U.S. PATENT DOCUMENTS

| 6,386,496 | B1 | 5/2002 | Lai et al. | |
|---|---|---|---|---|
| 6,530,570 | B2 * | 3/2003 | Ku | A63F 13/02 273/148 B |
| 9,080,714 | B2 * | 7/2015 | Minn | B60R 11/0241 |
| 2008/0230987 | A1 * | 9/2008 | Jackson | A63F 13/98 273/148 B |
| 2009/0325717 | A1 * | 12/2009 | Lee-Him | A63F 13/02 463/47 |
| 2010/0238642 | A1 | 9/2010 | Le Louarn et al. | |

* cited by examiner

*Primary Examiner* — Todd M Epps
(74) *Attorney, Agent, or Firm* — Middleton Reutlinger

(57) ABSTRACT

Apparatus and methods relating to a remote control mounting system having a clip and base are disclosed herein. In various embodiments, the clip may be designed for a specific remote control, and/or the clip may be attached to the base in one or more positions, giving the remote control mounting system modularity.

26 Claims, 8 Drawing Sheets

MODULAR REMOTE CONTROL MOUNT

CLAIM OF PRIORITY

None.

CROSS-REFERENCE TO RELATED APPLICATIONS

None.

TECHNICAL FIELD

Generally, a mounting device for a remote control is taught. More particularly, a modular mounting device having multiple mounting positions is taught.

BACKGROUND

Remote controls for televisions, monitors, and video game consoles are well known. By using such remote controls, a player or user can interact with a television, monitor, video game console, etc., which may be located some distance away so that the user does not need to be near the television or monitor.

These remote controls can be quite expensive. However, these remote controls are often left out after use and/or in anticipation of further use, and may be left out on a table or desk, for example, and/or in a common area. Accidents are prone to occur in common areas and/or on desks or tables, such as, for example, being damaged by a pet, by a roommate, a friend, or an acquaintance, or from a spilled drink, etc.

Moreover, as video gaming technology has advanced, game plots, graphics, level of detail, multi-player compatibility and other features have also advanced. Such advances in game play and/or technology associated with video games have increased interest in game play. With an increased interest in game play, the users and/or players of video games often spend extended periods of time playing video games. This fact, in combination with the fact that such video games are often played with remote controls, has resulted in extended handling and/or use of remote controls.

However, extended use of existing video game controls (or other remote controls) is often not ergonomically pleasing to users and/or players. Over extended periods of time, use of these remote controls can lead to discomfort, fatigue, and/or long term ailments such as carpal tunnel syndrome, for example.

Thus, there is a need in the art for overcoming the issues of existing systems.

SUMMARY

The present disclosure is directed toward methods and apparatus for a modular game control mount. The game control mount includes a base and a clip, with the clip rotatable and/or reversible with respect to the base to provide a plurality of positions of the clip relative to the base.

Generally, in one aspect, a modular remote control mount is provided that includes a base and clip. The clip is of a predetermined size and shape so that it may removably retain a corresponding remote control. For example, if the remote control is predetermined to be an Xbox One® controller, then the clip may be of predetermined size and shape to removably retain the Xbox One® controller therein. Similarly, the clip may be of a predetermined size and shape for a different remote control (for a video game or otherwise) instead of or in addition to the exemplary aforementioned Xbox One® controller (i.e. a single clip may be sized and shaped to removably retain one or more remote controls, as one of ordinary skill in the art may determine without undue experimentation). The base has a back side and a top surface, wherein the top surface is disposed at an angle relative to the back side. Thus, the back side may be made to rest on a surface (e.g., a desk or table) that is substantially horizontal, for example, and the top surface of the base will be disposed at an angle relative to that surface (desk, table, etc.). The clip is removably attachable to the base in at least two different positions, wherein the clip is rotatable relative to the base between the first position and the second position, with the top surface of the base adjacent the clip in each of the two different positions.

Optionally, the clip may be rotated about 180 degrees between the first position and the second position. In the first position a first end of the clip and a second end of the clip may be in an inclined relationship relative to the back side of the base (e.g., a line between the clip ends may be disposed at an angle of between more than about 0 degrees and less than about 90 degrees relative to the back side of the base). In the second position the first end of the clip and the second end of the clip may in a substantially parallel relationship with the back side of the base. Thus, the clip may be attached to the base in a first position wherein the clip is disposed at an angle (as measured from end to end) relative to the back side of the base, and the clip may be rotated (e.g., about 180 degrees) relative to the base into the second position wherein the clip is about parallel with the back side of the base, and the clip may be moved between the first position and the second position by way of the removable attachment to the base. The clip may include a plurality of springing legs that removably engage at least one aperture in the base to removably attach the clip to the base. The at least one aperture in said base may extend from said top surface toward said back side of said base. Each leg of the plurality of springing legs, if included, may include a foot that engages a corresponding foot recess in each aperture of the base. If included, each leg of the plurality of springing legs may include a foot that engages a corresponding foot holder lip that at least partially defines the aperture(s) instead of or in addition to engaging a corresponding foot recess. The clip may include a cord aperture suitable for allowing a cord to attach to the remote control through the clip. A hub may further be included. If a hub is included, it may include one or more mounting holes and/or the hub may be removably attachable to the back side of the base.

Generally, in another aspect, a remote control mount is provided that includes a clip and a base. The clip includes a first bracket and a second bracket. The first bracket is configured to removably engage a first side of a remote control and the second bracket is configured to removably engage a second side of the same remote control, and the second side is opposite the first side. The first bracket and/or the second bracket is/are substantially defined by a lip and a ridge, with the lip and the ridge sized and located to removably engage the remote control. The clip is removably and reversibly attached to the base. The base has an inclined top surface that is adjacent the clip in each of a first position and a second position, with the second position is disposed at an angle relative to the first position.

Optionally, the clip is rotated about 180 degrees in the second position relative to the first position. In the first position, the first bracket of the clip and the second bracket of the clip are in an inclined relationship relative to a back side of the base, where the back side is oppositely disposed of the top surface. In the second position, the first bracket and the second bracket are in a substantially parallel relationship with the back side of the base. The clip may include a plurality of springing legs that removably engage one or more apertures in the base. If such an aperture or apertures are present in the base, it/they may extend from the top surface toward an oppositely disposed back side of the base. If springing legs are included, each leg may include a foot that engages a corresponding foot recess in each aperture of the base. Each leg may include a foot that engages a corresponding foot holder lip that at least partially defines the aperture(s), instead of or in addition to engage a corresponding foot recess in each aperture. The clip may include a cord aperture that allows a cord to engage the remote control through the clip. The remote control mount may further include a hub. If a hub is included, it may include at least one mounting hole. The hub, if included, may be removably attachable to a back side of the base, where the back side is oppositely disposed the top surface.

Generally, in yet another aspect, a method of altering the orientation of a remote control is provided. The method includes the step of providing the remote control, a mounting clip, and a base. The remote control is attached to the mounting clip so that the remote control is removably retained by the mounting clip. The mounting clip is attached to the mounting base in a first position. The mounting clip is removed from the mounting base and rotated into a second position. The mounting clip is attached to the mounting base in the second position. Optionally, the method may further include the step of removably attaching the mounting base to a hub.

It should be appreciated that all combinations of the foregoing concepts and additional concepts discussed in greater detail below provided such concepts are not mutually inconsistent are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

In the drawings, like reference characters generally refer to the same parts throughout the different views. Also, the drawings are not necessarily to scale, and emphasis instead is generally placed upon illustrating the principles of the embodiments depicted.

DETAILED DESCRIPTION

Figure 1:
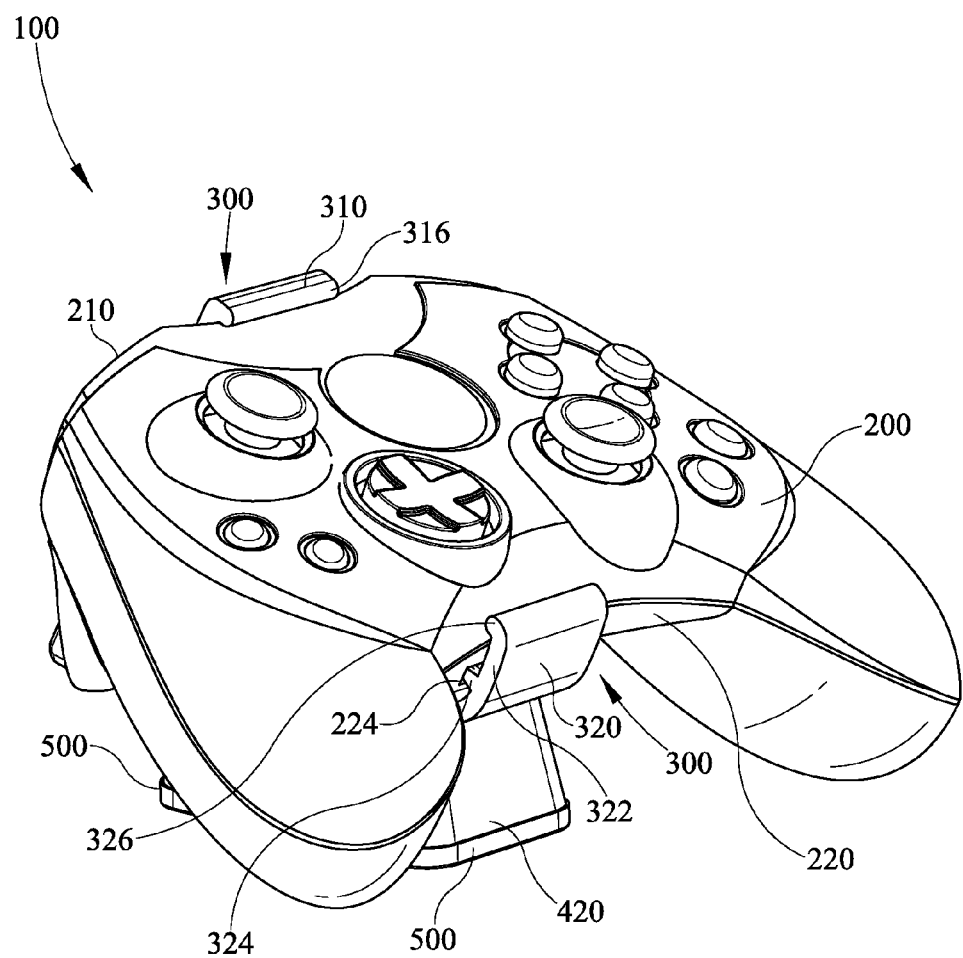
FIG. 1 is a perspective view of an exemplary game control with an embodiment of a game control mount connected thereto.

It is to be understood that the embodiments are not limited in their application to the details of construction and the arrangement of components set forth in the following description or illustrated in the drawings. Other embodiments are possible and may be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected" and "coupled" and variations thereof herein are used broadly and encompass direct and indirect connections and couplings. In addition, the terms "connected" and "coupled" and variations thereof are not restricted to physical or mechanical connections or couplings.

Figure 2:
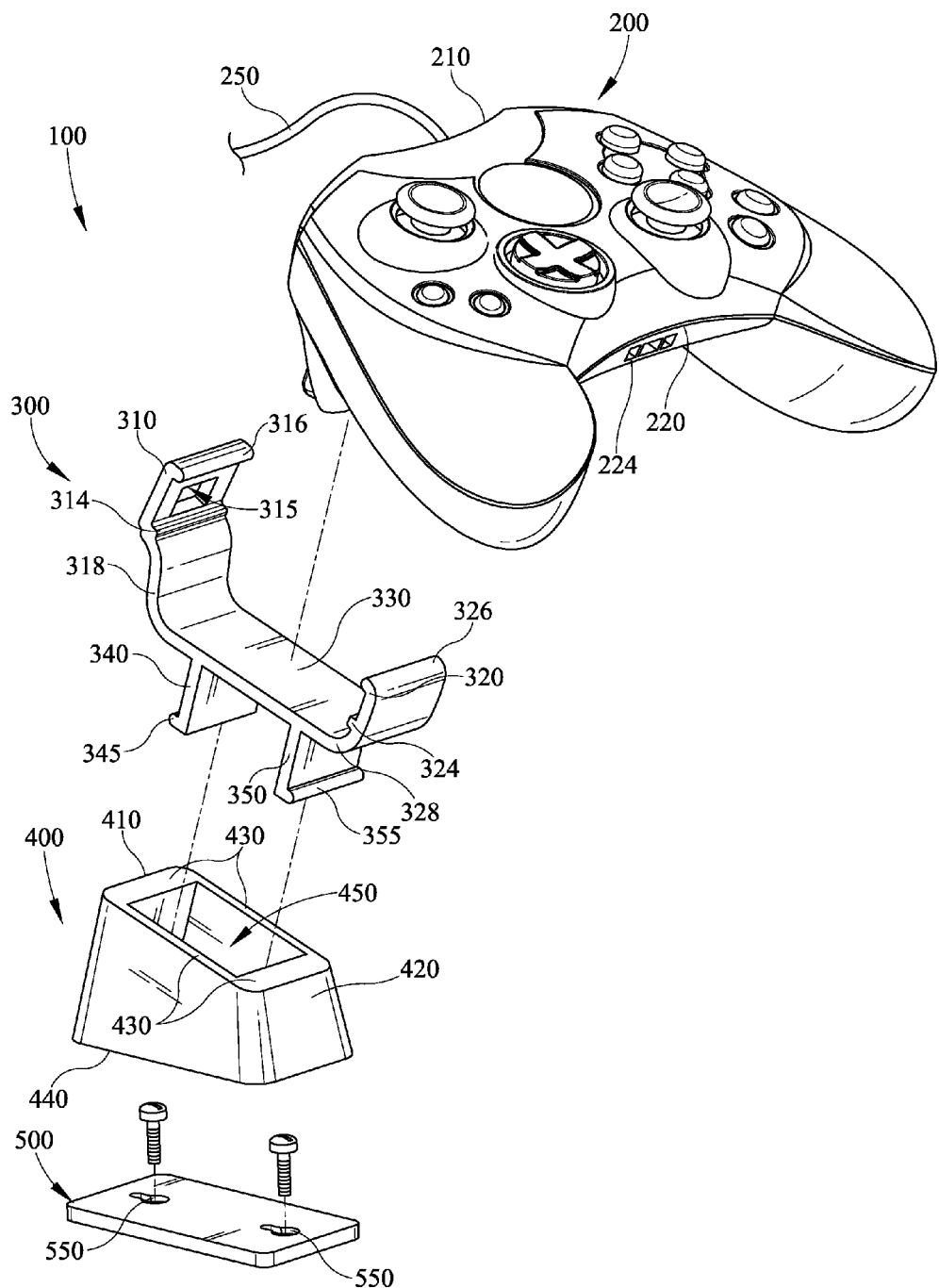
FIG. 2 is an exploded perspective view of the game control and mount of FIG. 1.

Referring initially to FIGS. 1 and 2, an embodiment of a remote control mount 100 is depicted retaining a remote control 200. Remote control mount 100 may include any or all of a clip 300, a base 400, and a hub 500. Clip 300 may removably retain remote control 200 so that, for example, remote control 200 may repeatedly be inserted or clipped into clip 300 and removed therefrom. Base 400 may removably retain clip 300 so that, for example clip 300 may repeatedly be inserted or clipped into base 400. Hub 500 may removably retain base 400 so that, for example, base 400 may repeatedly be inserted or clipped onto hub 500 and removed therefrom. Hub 500 may include one or more mounting holes 550, for example, to facilitate securing hub 500 to a wall, desk, table, or other surface or structure. In some embodiments, hub 500 may be mounted to a surface (wall, table, desk, etc.) with bolts or screws, and base 400 may be removably affixed to hub 500 via a removable attachment mechanism such as, for example, a friction fit, mechanical snap or clip, magnet, hook-and-loop fastener, or any other mechanism or any combination thereof.

Thus, in these or other embodiments, remote control mount 100 may be mounted as desired for storage, to protect remote control 200 from damage, to proudly display remote control mount 100 or any portion thereof, or for any other reason. For example, any portion of remote control mount 100 (e.g., clip 300, base 200, and/or hub 500) may be customized, decorated, and/or stylized to suit a given user's preference and/or for self-expression. It is understood that base 400 may be separated from hub 500 (e.g., when being used, base 400 may be pulled off of hub 500, which may stay affixed to a wall, table, desk, etc.), hub 500 may travel with base 400, or both.

Clip 300 may be sized, shaped, and/or dimensioned in a way that allows and/or facilitates removable retention of remote control 200 therein. For example, clip 300 may be or include a tension clip device and/or a snap-in style attachment mechanism. Clip 300 may include a first end bracket 312 that is sized, shaped, and/or dimensioned to correspond to a first end 210 of remote control 200. Instead of or in addition to first end bracket 312 corresponding to remote control first end 210, a second end bracket 322 may be sized, shaped, and/or dimensioned to correspond to a second end 220 of remote control 200. In some embodiments, first end 210 and second end 220 of remote control 200 may be oppositely disposed and/or provide convenient mounting locations for clip 300. In these or other embodiments, first end bracket 312 and second end bracket 322 may correspondingly be oppositely disposed so that they are easily aligned or alignable with first end 210 and/or second end 220 of remote control 200. Such an arrangement may facilitate removably retention of remote control 200 in clip 300.

First end bracket 312 may include and/or be substantially defined on one end by a first end lip 316 and on the other end by a first end ridge 314. Although neither first end lip 316 or first end ridge 314 are required, either or both may be dimensioned based on a predetermined remote control 200 (or first end 210 thereof) to allow remote control 200 to snap-in, to structurally support remote control 200, and/or to retain remote control 200 in first end bracket 312 of clip 300. Second end bracket 322 may include and/or be substantially defined on one end by a second end lip 326 and on the other end by a second end ridge 324 interposed therebetween. Second ridge 324, if included, may be sized, shaped, and/or configured to engage a notch 224 of remote control 200, for example, to provide a more secure attachment and/or structural support for remote control 200. Second end ridge 324 may be a projection extending from second end bracket 322 and/or clip 300 toward remote control second end 220 and/or remote control 200. Notch 224 may be a data port, a cord attachment location, or any other feature of remote control 200. Although second end lip 326 and second end ridge 324 are optional, any or all of these features may be dimensioned based on a predetermined remote control 200 (or second end 220 thereof) to allow remote control 200 to snap-in, to structurally support remote control 200, and/or to retain remote control 200 in second end bracket 322 of clip 300.

In some embodiments, either or both of first end bracket 312 and second end bracket 322 may include an opening or aperture, such as cord aperture 315, to facilitate connection of a cable, cord, wire, or similar structure, such as cord 250 for example, to remote control 200. For example, remote control 200 may allow removable connection of a power cord and/or data cable to it, such as at first end 210. Cord aperture 315 may facilitate connection and/or removal of such a cord or cable, or other structure. Location of cord aperture 315 may be predetermined and/or based on the location of, for example, cord 250 or any other cord or feature for remote control 200.

In some embodiments, cord 250 may be removable and/or attachable to remote control 200 and/or cord aperture 315 may be substantially surrounded by clip 300 or a portion thereof. In other embodiments, cord 250 may be substantially permanently or semi-permanently attached to remote control 200. In such embodiments, clip aperture 315 may be substantially slotted and/or extend through the perimeter of an adjacent portion of clip 300 so that, for example, clip 300 may be slid onto or otherwise engage remote control 200 without the need to separate cord 250 from remote control 200. It is understood that clip aperture 315 may be any of a variety of shapes, including, but not limited to, square, rectangular, polygonal, circular, round, oval, elliptical, freeform, curved, straight edged, or any other shape, or any combination thereof. It is further understood that, as mentioned above, clip aperture 315 may have a perimeter that is substantially defined by and/or surrounded by a portion of clip 300 (e.g., clip first end bracket 312 as shown in the figures, clip second end bracket 322, and/or any other portion of clip 300 or any combination thereof), or clip aperture 315 may have at least one side that is open and/or not enclosed or defined by clip 300 or a portion thereof (e.g., to allow accessibility to clip aperture 315 from outside its perimeter). Further still, it is understood that clip aperture 315 is optional, and that, if included, any number of clip apertures 315 may be included and/or may be located at any of a variety of locations on clip 300 or otherwise.

First end bracket 312 may be extended away from a clip body 330 further than second end bracket 322 is extended away from clip body 330, or vice versa. In this way, remote control 200 may be held at an angle relative to clip body 330 when remote control 200 is retained in clip 300. In some embodiments, clip 300 may include a first bend 318 interposed between clip body 330 and first end bracket 312 and/or clip 300 may include a second bend 328 interposed between clip body 330 and second end bracket 322. First bend 318 may be longer (or shorter) than second bend 328, for example, to achieve an angle or incline between first end bracket 312 and the second end bracket 322 (i.e. the hypotenuse) relative to clip body 330.

Base 400 may include a top surface 430, which may abut and/or be adjacent clip 300, for example at or near a clip body 330, when clip 300 is attached to base 400. In some embodiments, top surface 430 may be angled and/or inclined relative to a back side 440 of base 400. In this way, base 400 may rest on a surface (e.g., a substantially horizontal surface such as a table or desk, and/or a vertical surface such as a wall) and top surface 430 may be disposed at an angle or incline relative thereto. Thus, for example, base 400 may rest, for example, on a table or desk with back side 440 adjacent to the table or desk, while top surface 430 is at an incline relative to the table or desk. For example, a first base end 410 may be longer and/or taller than a second base end 420, which may result in top surface 430 being angled or inclined relative to back side 440.

Clip 300 may include an attachment mechanism for attachment to base 400. Such an attachment mechanism may be removable so that, for example, clip 300 may be attached to and/or removed from base 400 repeatedly. In some embodiments, the attachment mechanism may be symmetric and/or reversible, allowing clip first end 310 and/or clip second end 320 to be adjacent either first base end 410 or second base end 420. For example, clip 300 may be attached to base 400 in a first position so that clip first end 310 is adjacent first base end 410 (and clip second end 320 is adjacent second base end 420), clip 300 may be removed from base 400, and/or clip 300 may be attached to base 400 in a second position so that clip second end 320 is adjacent first base end 410 (and clip first end 310 is adjacent second base end 420).

Such removable, modular, and/or reversible attachment of clip 300 to base 400 may be achieved in any of a variety of ways. For example, in some embodiments clip 300 may include a plurality of attachment projections, such as first leg 340 and second leg 350. First leg 340 and/or second leg 350 may be inserted into base 400 via clip aperture 450. First leg 340 and second leg 350 may be similarly sized and/or shaped so that either may be inserted near base first end 410 and either may be inserted near base second end 420. In this way, or in any other way, modular and/or reversible attachment of clip 300 to base 400 may be achieved. Either or both of first leg 340 and second leg 350 may be removably retained within clip aperture 450 of base 400 such as, for example, by a friction fit, separable clipping mechanism (such as first foot 345 and/or second foot 355, which may be inserted into first foot recess 451 or second foot recess 452 (shown in more detail in FIGS. 5 and 6), or any other removable attachment mechanism.

By using a modular design, any of a variety of clips 300 may be used with any of a variety of bases 400, and/or any of a variety of clips 300 or bases 400 may be used with any of a variety of hubs 500. Thus, for example, clip 300 may be designed for any of a variety of remote controls 200. Remote control 200 may be an Xbox One® controller, for example, having certain dimensions, a certain shape, and/or certain features (e.g., a notch 224 for attachment of a data cable), any or all of which may require a specially designed, shaped, and/or dimensioned clip 300. Furthermore, clip 300 may include features to correspond to the features of remote control 200. Furthering the Xbox One® example, clip 300 may have, for example, second end ridge 324 that is insertable into notch 224 for any of a variety of reasons, including, but not limited to, enhancing the attachment of clip 300 to remote control 200, to provide structural support to the combination of clip 300 and remote control 200, and/or to protect notch 224 from contaminants. Other clips 300 may be designed for use also with Xbox One® controllers, or for other video game consoles, such as, for example, Xbox 360®, PlayStation 3®, PlayStation 4®, or any other video game console, television, monitor, or any other remote controller, or any combination thereof.

Clips 300 for any pre-determined remote control 200 may have corresponding features for attachment to remote control 200, but may have a substantially universal attachment mechanism with base 400. A given base 400 may allow attachment with any of a variety of clips 300 to provide added modularity. Hubs 500 may have a substantially universal attachment mechanism with any of a variety of bases 400 to provide added modularity. Thus, clips 300, bases, 400, and/or hubs 500, or any component thereof, may be mixed and matched as desired, which may minimize the need to replace an entire remote control mount 100 (or any additional component thereof, for example, when only a new clip 300 is needed for a new remote control 200), and/or which may allow added customization and/or stylization of remote control mount 100, for example, for display on a user's wall, table, desk, etc. Such modularity may also allow addition of a new clip 300 (e.g., which may be dimensioned or shaped differently, and/or have different or additional clip apertures 315), for example when a new game console and/or remote control 200 is released in the future, without the need to replace base 400 and/or hub 500.

Figure 3:
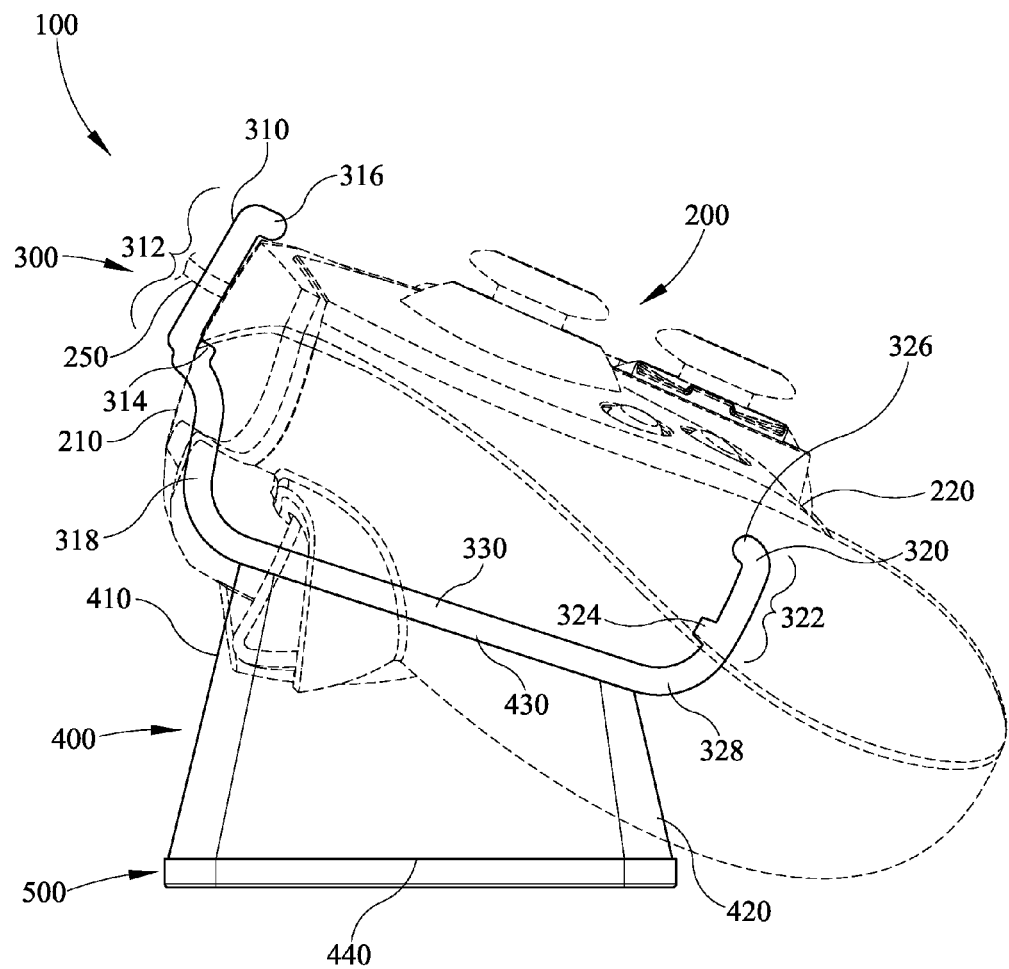
FIG. 3 is a side view of the game control and mount of FIG. 1, with the mount configured to hold the game control in a first, or inclined, position.

FIG. 3 shows remote control mount 100 in an exemplary first position. In this first position, clip first end 310 is adjacent first base end 410 and clip second end 320 is adjacent second base end 420. In this embodiment, first base end 410 is longer or taller than second base end 420, resulting in an inclined top surface 430 relative to back side 440. Clip first end 310 and/or clip first bend 318 is longer and/or extended away from clip body 330 more so than clip second end 320 and/or clip second bend 328, resulting in an inclined relationship of clip first end 310 relative to clip second end 320. For example, if a straight line was drawn from first lip 316 to second lip 326, this straight line would be at an angle or incline relative to clip body 330 and/or the plane in which clip body 330 lies. As shown in the exemplary first position of FIG. 3, the relative inclines compound so that remote control 200 is held at an angle or incline relative to back side 440 (which may rest on an underlying surface such as a table or desk, etc.). In this exemplary first position, the angle or incline of remote control 200 from first end 210 to second end 220, relative to back side 440 of base 400 or the underlying surface, is about the sum of the angle or incline of top surface 430 of base 400 and the angle or incline from clip first end 310 to clip second end 320 relative to clip body 330.

Figure 4:
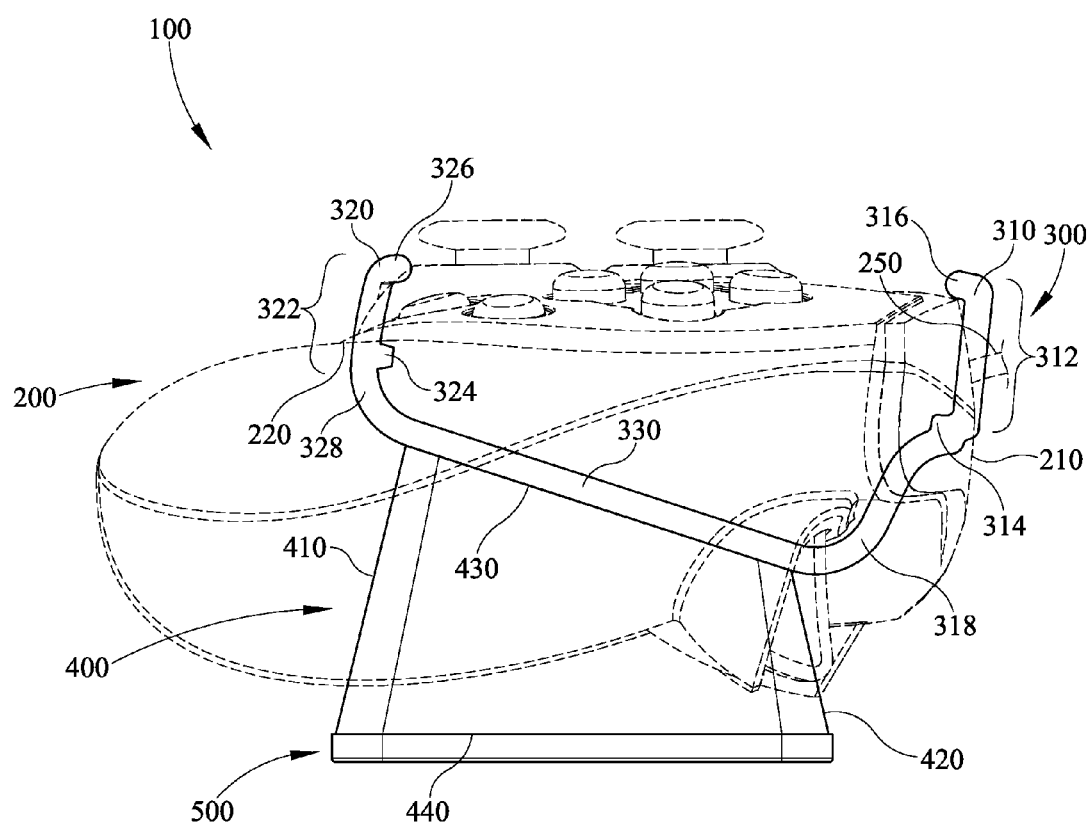
FIG. 4 is a side view of the game control and mount of FIG. 1, with the mount configured to hold the game control in a second, or horizontal, position.

FIG. 4 illustrates how a second exemplary position of remote control 200 and/or remote control mount 100 may be achieved by repositioning clip 300 relative to base 400. For example, as shown in FIG. 4, the second position may result from reversing or turning clip 300 180 degrees relative to base 400. In this example, clip first end 310 is adjacent second base end 420, and clip second end 320 is adjacent first base end 410. In this exemplary second position, the angle or incline of top surface 430 of base 400, and the angle or incline of clip 300 resulting from a relatively longer (or farther projecting) clip first end 310 relative to clip second end 320, may counterbalance one another, and/or may substantially cancel out, so that remote control 200 is held at or near parallel (or horizontal) with back side 440 of base 400, or the underlying surface (e.g., desk or table, etc.). Thus, rotating or reversing the orientation of clip 300 relative to base 400 may result in a different angular orientation or disposition of remote control 200 relative to back side 440 of base 400, or an underlying surface. It is understood that an orientation or second position in which remote control 200 is substantially horizontal is exemplary, and remote control 200 and/or remote control mount 100 or any component thereof may be held at any of a variety of angles or orientations.

Having more than one angular orientation for remote control 200 available via adjustment of remote control mount 100 (e.g., by reversing clip 300 relative to base 400) may allow a user to select a preferred position (e.g., a first position or a second position), which may vary from user to user, may vary based on the purpose for which remote control 200 is being used (e.g., if a video game remote control, a user's preference may vary depending on what game is being played), or may be varied for the sake of variance, which may be desirable after a long stint of playing a game and/or using remote control 200, for example. After a long period of time, it may become more comfortable and/or ergonomically pleasing to vary remote control 200 from a first position to a second position, for example, to change the user's posture and/or the muscles being used.

Figure 5:
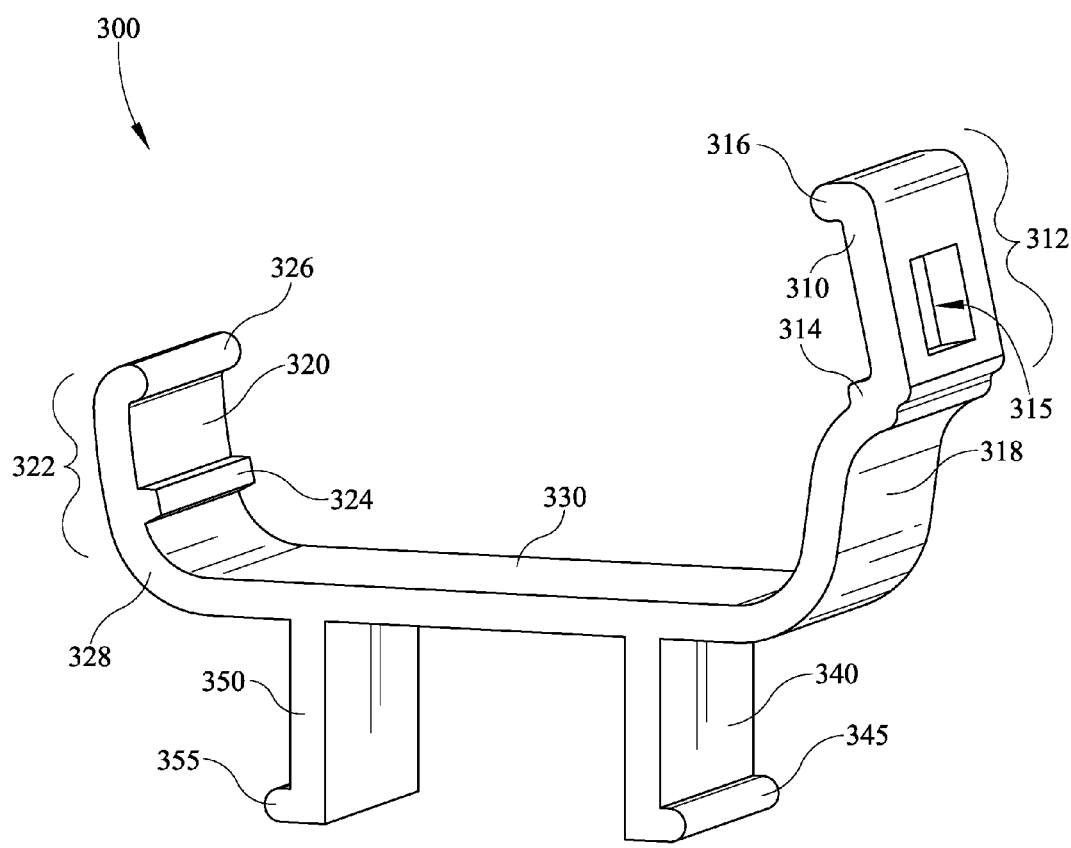
FIG. 5 is a perspective view of an embodiment of a clip portion of an exemplary game control mount.
Figure 6:
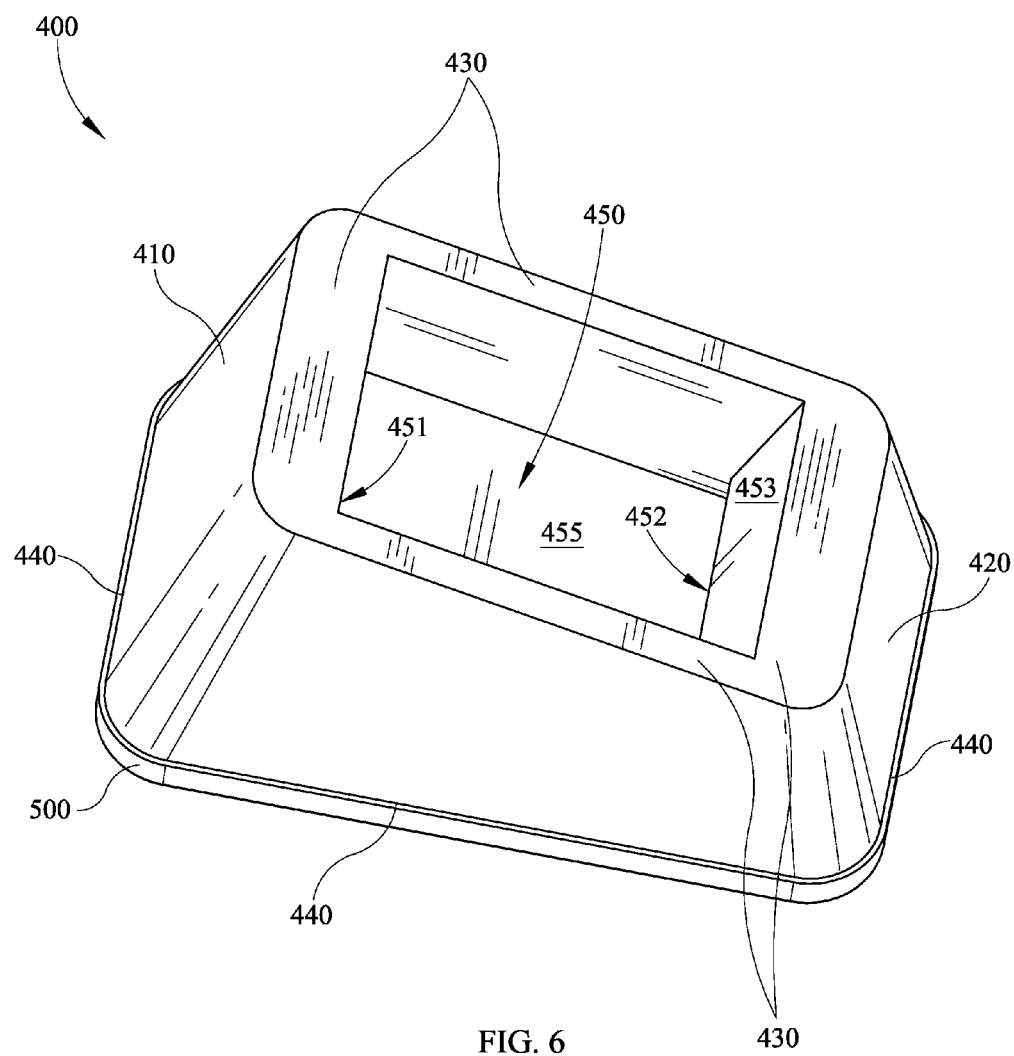
FIG. 6 is a perspective view of an embodiment of a base portion of an exemplary game control mount.

Referring now to FIGS. 5 and 6, the features of clip 300 and base 400 are shown in more detail. First leg 340 and/or second leg 350 of clip 300 may include respective first foot 345 and/or second foot 355. First foot 345 may engage first foot recess 451 or second foot recess 452 of clip aperture 450 of base 400, depending on what position (e.g., first or second) is to be achieved by attachment of clip 300 to base 400. In this way, attachment of clip 300 to base 400 may be relatively strong (e.g., first foot 345 and/or second foot 355 may act as mechanical stops within first foot recess 451 and/or second foot recess 452), yet removable (any or all of first foot 345, second foot 355, first foot recess 451, and second foot recess 452 may be rounded to facilitate removal), and/or reversible (first foot 345 may engage either first foot recess 451 or second foot recess 452, and second foot 355 may engage either first foot recess 451 or second foot recess 452). In order to facilitate and/or enhance engagement of first foot 345 and/or second foot 355 with first foot recess 451 and/or second foot recess 452, either or both of first leg 340 and second leg 350 may be compressible to allow insertion into clip aperture 450 of base 400, and either or both of first leg 340 and second leg 350 may be springing so that either or both of first foot 345 and second foot 355 expand outwardly into first foot recess 451 and/or second foot recess 452. Clip 300 or a portion thereof (e.g., second leg 350) may rest against, be supported by, and/or be retained in base 400 by a base inner side surface 453. Base 400 may optionally have a base inner lateral surface 455, although it is understood that surfaces 453 and 455 are not required. If included, base inner lateral surface 455 may substantially define a lower or bottom portion of first foot recess 451, second foot recess 452, or both.

Figure 7A:
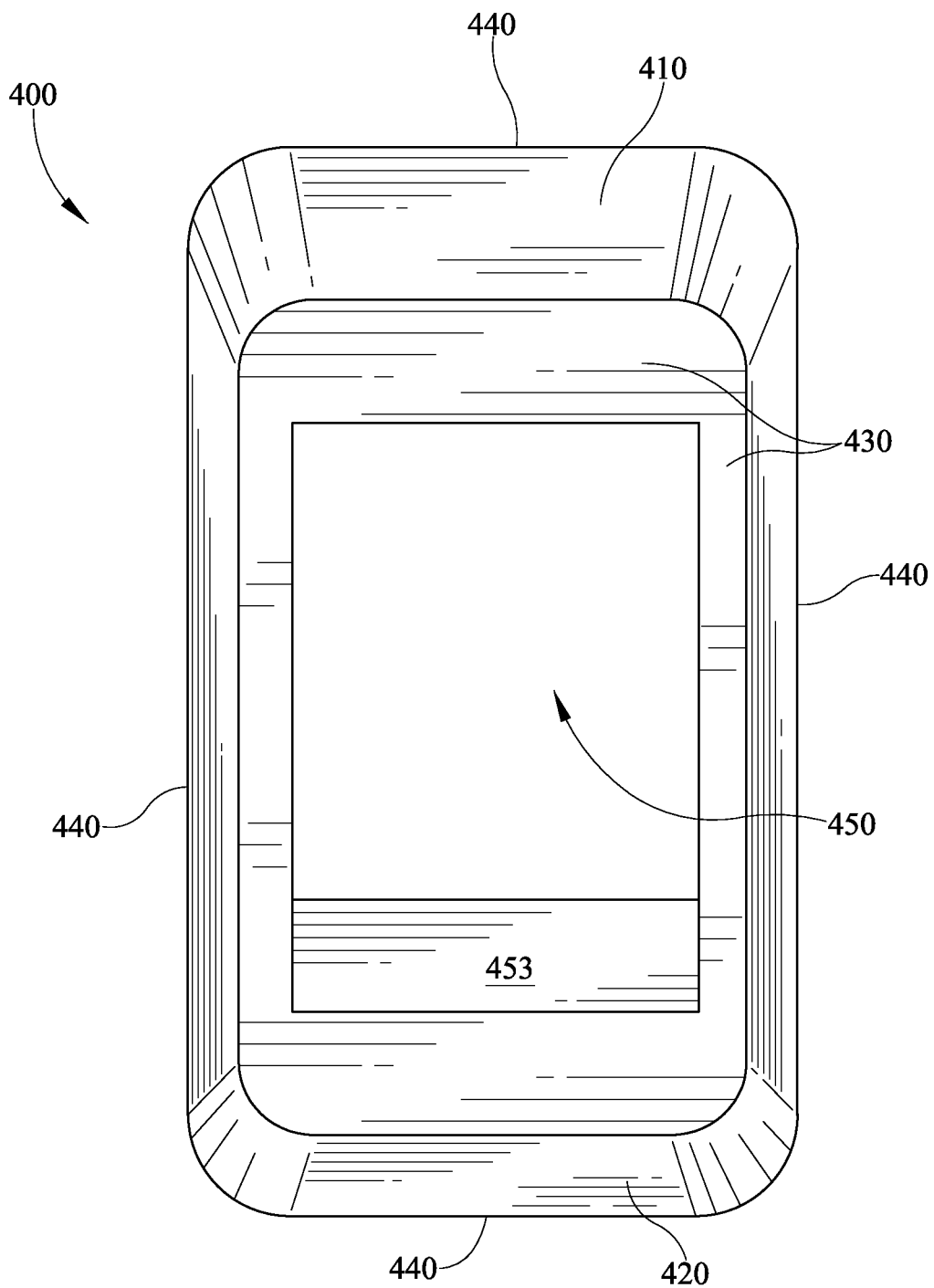
FIG. 7A is a top view of the base portion of FIG. 6.
Figure 7B:
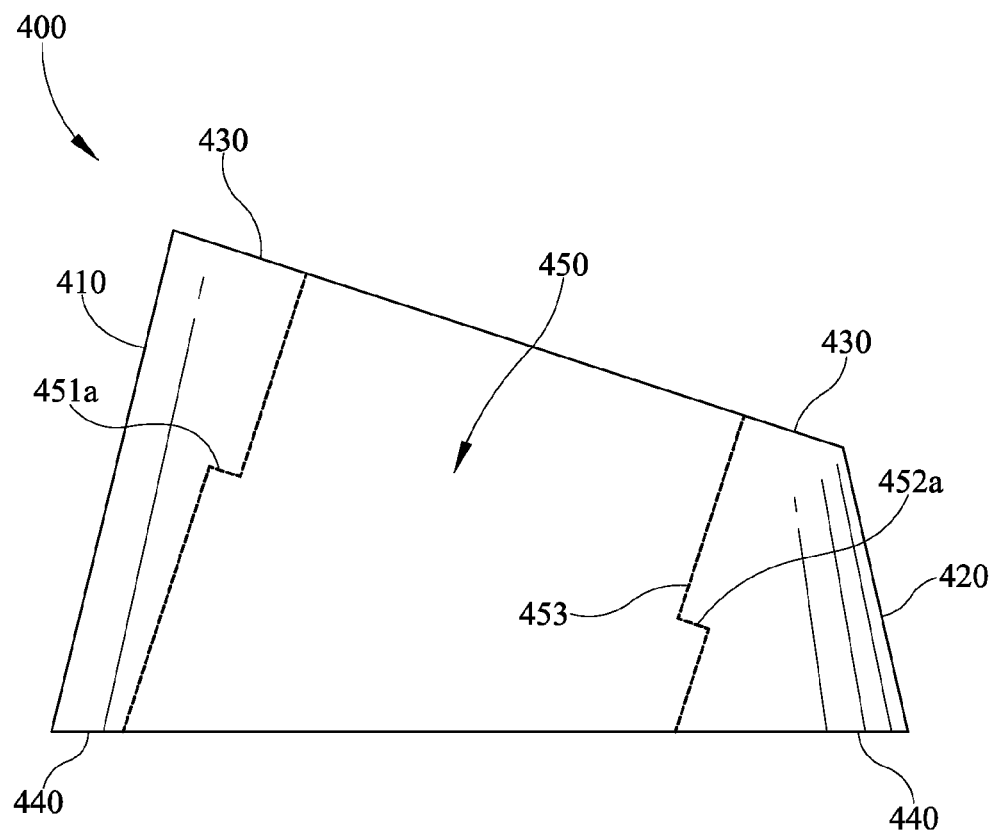
FIG. 7B is a side view of the base portion of FIG. 6.

For example, alternative embodiments of base 400, such as the exemplary base 400 illustrated in FIGS. 7A and 7B, may include or define clip aperture 450 in such a way that clip aperture 450 extends substantially through base 400 (e.g., from top surface 430 to or through back side 440). It is understood that in such embodiments base 400 may be substantially without a base inner lateral surface 455. If there is no base inner lateral surface 455 and/or clip aperture 450 extends substantially through back side 440 of base 400, either or both of first foot recess 451 and second foot recess 452 may be without a surface to define them on at least one side. In such embodiments base 400 may include a first foot holder lip 451a and/or a second foot holder lip 452a, either or both of which may act as a mechanical stop to engage and/or removably retain first foot 345 and/or second foot 355, respectively.

Any of a variety of materials may be used to form remote control mount 100 or any component thereof. Moreover, it is understood that clip 300, base 400, and hub 500 may be substantially formed of the same material, or of different materials, and that the material used for one may be independent of the material used for any other. It is further understood that a variety of materials may be used to form any given component or feature of remote control mount 100, or any portion thereof. For example, clip 300, base 400, hub 500, and/or any component thereof may be formed of plastic, rubber, wood, metal, cardboard, or any other material or any combination thereof. Moreover, it is understood that any of a variety of methods may be used to form remote control mount 100 or any component thereof. For example, any or all of clip 300, base 400, hub 500, and/or any component thereof may be injection molded, 3D printed, thermoformed, welded, sonic welded, glued, adhered, fastened, bolted, screwed, nailed, or any other method or any combination thereof.

In use, a user may procure, acquire, and/or provide remote control 200, mounting clip 300, mounting base 400, and/or hub 500. The user may attach remote control 200 to mounting clip 300 (if not already attached) so that remote control 200 is removably retained by mounting clip 300 (e.g., via springing legs 340, 350 as discussed above, or via another removable attachment mechanism instead of or in addition to one or more springing legs 345, 355). Mounting clip 300 may be attached to mounting base 400 in a first position (e.g., in an inclined position as shown in FIG. 3 or in a substantially horizontal or parallel position as shown in FIG. 4). Mounting clip 300 may be removed from the first position as attached to mounting base 400. Mounting clip 300 may be attached to mounting base 400 in a second position (e.g., in the other of the positions depicted in FIGS. 3 and 4), so that if FIG. 3 represents the first position FIG. 4 represents the second position, or vice versa. It is understood that neither the first position nor the second position are limited to the positions shown in FIG. 3 or 4, as these are merely exemplary positions illustrated for the purposes of explanation only. Mounting base 400 may be removably attached to hub 500, for example, as discussed above. In this way, or in any other way, the modular design and/or the mix-and-match design of clip 300, base 400, and/or hub 500, such as that described above, for example, may be achieved.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

What is claimed is:

1. A modular remote control mount, comprising:
   a clip for removably retaining a remote control;
   a base having a back side and a top surface, said top surface disposed at an angle relative to said back side; and
   said clip removably attachable to said base in at least a first position and a second position, said clip adjacent said top surface of said base when said clip is in each of said first position and said second position.

2. The modular remote control mount of claim 1, wherein said first position is located approximately 180 degrees from said second position.

3. The modular remote control mount of claim 1, wherein in said first position a first end of said clip and a second end of said clip are in an inclined relationship relative to said back side of said base.

4. The modular remote control mount of claim 1, wherein in said second position a first end of said clip and a second end of said clip are in a substantially parallel relationship with said back side of said base.

5. The modular remote control mount of claim 1, wherein said clip includes a plurality of springing legs that removably engage at least one aperture in said base.

6. The modular remote control mount of claim 5, wherein said at least one aperture in said base extends from said top surface toward said back side of said base.

7. The modular remote control mount of claim 5, wherein each leg of said plurality of springing legs includes a foot that engages a corresponding foot recess in each aperture of said at least one aperture in said base.

8. The modular remote control mount of claim 5, wherein each leg of said plurality of springing legs includes a foot that engages a corresponding foot holder lip that at least partially defines said at least one aperture.

9. The modular remote control mount of claim 1, further comprising a cord aperture in said clip suitable for allowing a cord to said remote control through said clip.

10. The modular remote control mount of claim 1, further comprising a hub.

11. The modular remote control mount of claim 10, wherein said hub includes at least one mounting hole.

12. The modular remote control mount of claim 10, wherein said hub is removably attachable to said back side of said base.

13. A remote control mount, comprising:
    a clip and a base;
    said clip including a first bracket and a second bracket, said first bracket configured to removably engage a first side of a remote control, said second bracket configured to removably engage a second side of said remote control, wherein said second side is opposite said first side;
    said clip removably and reversibly attachable to said base in each of a first position and a second position; and
    said base having an inclined top surface adjacent said clip in each of said first position and said second position, said second position disposed at an angle relative to said first position.

14. The remote control mount of claim 13, wherein said first position is located about 180 degrees from said second position.

15. The remote control mount of claim 13, wherein in said first position said first bracket of said clip and said second bracket of said clip are in an inclined relationship relative to a back side of said base, said back side oppositely disposed said top surface.

16. The remote control mount of claim 13, wherein in said second position said first bracket of said clip and said second bracket of said clip are in a substantially parallel relationship with a back side of said base, said back side oppositely disposed said top surface.

17. The remote control mount of claim 13, wherein said clip includes a plurality of springing legs that removably engage at least one aperture in said base.

18. The remote control mount of claim 17, wherein said at least one aperture in said base extends from said top surface toward an oppositely disposed back side of said base.

19. The remote control mount of claim 17, wherein each leg of said plurality of springing legs includes a foot that engages a corresponding foot recess in each aperture of said at least one aperture in said base.

20. The remote control mount of claim 17, wherein each leg of said plurality of springing legs includes a foot that engages a corresponding foot holder lip that at least partially defines said at least one aperture.

21. The remote control mount of claim 13, further comprising a cord aperture in said clip suitable for allowing a cord to engage said remote control through said clip.

22. The remote control mount of claim 13, further comprising a hub.

23. The remote control mount of claim 22, wherein said hub includes at least one mounting hole.

24. The remote control mount of claim 22, wherein said hub is removably attachable to a back side of said base, said back side oppositely disposed said top surface.

25. A method of altering an orientation of a remote control, comprising the steps of:
   attaching a remote control to a mounting clip so that said remote control is removably retained by said mounting clip;
   attaching said mounting clip to a mounting base in a first position;
   removing said mounting clip from said mounting base in said first position;
   rotating said mounting clip away from said first position toward a second position; and
   attaching said mounting clip to said mounting base in said second position.

26. The method of claim 25, further comprising the step of removably attaching said mounting base to a hub.

* * * * *